Oct. 19, 1926.

H. A. FREDERICK

TESTING DEVICE

Filed Oct. 22, 1924

1,603,273

Inventor:
Halsey A. Frederick
by E.W. Adams, Atty.

Patented Oct. 19, 1926.

1,603,273

UNITED STATES PATENT OFFICE.

HALSEY A. FREDERICK, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

TESTING DEVICE.

Application filed October 22, 1924. Serial No. 745,058.

This invention relates to testing devices and more specifically to a device particularly well adapted for use for testing the burning or frying noises in telephone transmitters and the like.

When telephone transmitters have been submitted to long use, it has been found that arcing between the carbon granules, excessive heat and other causes gradually affect the characteristics of the transmitter and produce noise which renders the telephone conversation unintelligible. The laboratory transmitter testing machines now in use have proved too costly and their operation too complex for use in recovery and repair shops, and the object of this invention is to provide a method of and apparatus for testing transmitters which will be simple to operate, accurate, cheap to manufacture, and wherein the burning condition of telephone transmitters may be determined in a simple manner.

From a large amount of data taken on transmitters obtained from various repair shops, it was determined that there was sufficient correlation between maximum burning and minimum current of transmitters when tested by burning test methods to accept or reject transmitters for burning on the basis of their minimum current readings only. It was determined that transmitters through which the current readings were above a certain amount were acceptable and those below could be rejected as inefficient.

A feature of the invention is the provision of means whereby the amount of burning or related defects in the transmitter button is visually indicated.

Another feature is the provision of means for producing a uniform amount of noise in the transmitter.

Another feature is the provision of means whereby the transmitter and receiver are insulated from outside noise during the testing operation.

Another feature is the provision of means whereby the electrical circuit may be controlled in a simple and positive manner.

Figure 1:
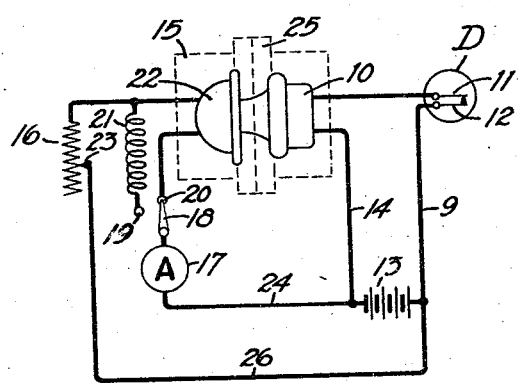
Figure 2:
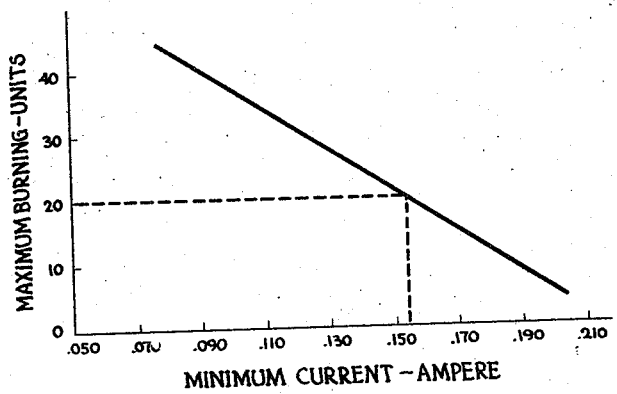

Other features and advantages will appear from the following description and by the claims appended thereto, reference being had to the accompanying drawings in which Fig. 1 is a diagrammatical view of the testing device and Fig. 2 is a curve showing the values of the current crossing between the electrodes in correlation with the amount of burning in the carbon granules.

The testing device diagrammatically shown in Fig. 1 consists of an ordinary telephone receiver 10 connected to normally open contact springs 11 and 12 of an interrupter D which may be in the form of any well-known type of calling dial or any other convenient means for uniformly making and breaking the circuit with which it is associated. Contact spring 12 is connected to one side of battery 13 by means of lead 9. Battery 13 has its other terminal connected to the lead 14, thus completing the circuit through the telephone receiver 10. The casing 15 shown in dotted line in Fig. 1 is provided with cover 25 provided with suitable fastening means (not shown) adapted for clamping the transmitter 22 to be tested in juxtaposition with the receiver 10 and to insulate them from outside noise during the testing operation. The transmitter 22 has one terminal connected to one terminal of a variable resistance 16 which includes wiper 23 connected to lead 26 which has its other end connected to battery 13. The other terminal of transmitter 22 may be connected to one side of an ammeter 17 through a switching member 18, which rests on a contact 20 for completing a testing circuit which includes the lead 24. Switching member 18 is also adapted to be moved on contact 19 of an impedance device 21 to form a calibrating circuit the function of which will be hereinafter described.

The operation of the testing device is as follows: The transmitter to be tested is placed in the casing 15 the cover closed to insulate the transmitter 22 from outside noise and to hold the transmitter mouthpiece tightly against the earpiece of the receiver 10 as shown in the drawing. The switch 18 is moved in contacting relation with contact 19 for connecting the impedance 21 and thereby completing a calibrating circuit in which the wiper 23 of the variable resistance is adjusted to bring the current flow in the circuit to a value corresponding to the minimum value which has been found allowable for the particular type of transmitter under test, say 150 milliamperes. The switch 18 is then moved in contacting relation with contact 20 to substitute the transmitter 22 for impedance 21. The dial B is then operated to cause a series of makes and breaks in this circuit. The diaphragm of the receiver 10 agitates the transmitter diaphragm in the ordinary manner. The transmitter is then left undisturbed in the circuit and allowed to reach a state of equilibrium.

The current flowing through the transmitter when it is substituted for the fixed resistance should not be less than the predetermined value mentioned above which corresponds to the maximum burning permissible for a satisfactory transmitter. This condition is graphically indicated in the curve shown in Fig. 2 where the current is indicated on the axis of abscissas in relation to certain arbitrary burning units indicated on the axis of ordinates for one particular type of transmitter. Similar curves have been found to exist for other types, that is, in all granular carbon transmitters the burning and the maximum resistance or minimum current have been found definitely correlated after a period of service if tested in a circuit in which the resistance in series with the transmitter is approximately equal to or greater than that of the transmitter itself. It is obvious that the dial of the ammeter 17 may be graduated in burning units instead of amperes or in each value in correlation to the other; also that the corresponding voltage across the transmitter might be measured instead of the current through it.

What is claimed is:

1. In a testing set, a transmitter and receiver in juxtaposition, means for insulating said transmitter and said receiver from outside noise, a circuit for said receiver including an interrupter, a circuit including a fixed and a variable resistance and a meter, a circuit including said transmitter and said variable resistance, and a manual switch for controlling said latter circuits.

2. In a testing set, a sound proof casing, a transmitter and a receiver in juxtaposition therein, an interrupter circuit including said receiver and said interrupter, a fixed resistance substantially equal to the maximum allowable transmitter resistance, a variable resistance, a meter, a calibrated circuit including said resistances and meter, and a manual switch for substituting said transmitter for said fixed resistance.

In witness whereof, I hereunto subscribe my name this 15th day of October A. D., 1924.

HALSEY A. FREDERICK.